US012619740B2

(12) United States Patent
Beard et al.

(10) Patent No.: US 12,619,740 B2
(45) Date of Patent: May 5, 2026

(54) SIMULATION OF MALWARE WITH CHANGING SIGNATURES

(71) Applicant: BRITISH TELECOMMUNICATIONS PUBLIC LIMITED COMPANY, London (GB)

(72) Inventors: Alfie Beard, London (GB); Tom Bowman, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/845,189

(22) PCT Filed: Feb. 13, 2023

(86) PCT No.: PCT/EP2023/053486
§ 371 (c)(1),
(2) Date: Sep. 9, 2024

(87) PCT Pub. No.: WO2023/169772
PCT Pub. Date: Sep. 14, 2023

(65) Prior Publication Data
US 2025/0190583 A1      Jun. 12, 2025

(30) Foreign Application Priority Data

Mar. 10, 2022      (GB) ..................................... 2203355

(51) Int. Cl.
*G06F 21/57*            (2013.01)
(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS 7,739,740 B1 * 6/2010 Nachenberg .......... G06F 21/566
713/188
8,065,731 B1 11/2011 Nucci
(Continued)

FOREIGN PATENT DOCUMENTS

CN         109190375         1/2019
EP         1990973           11/2008
(Continued)

OTHER PUBLICATIONS

Joachim Fabini et al. ("Malware propagation in smart grid networks: metrics, simulation and comparison of three malware types", Aug. 28, 2018, Journal of Computer Virology and Hacking Techniques, vol. 15, pp. 109-125.) (Year: 2018).*
(Continued)

*Primary Examiner* — Nelson S. Giddins
(74) *Attorney, Agent, or Firm* — Nixon & Vanderhye P.C.

(57) ABSTRACT

A computer-implemented method of simulating a propagation of a malware through a set of computer systems, the method comprising: identifying a simulated computer system infected with a simulated malware; determining a first signature of the simulated malware; determining that a mutation condition for the simulated malware has been met; and in response to determining that the mutation period has been met, changing the first signature of the simulated malware to a second signature.

17 Claims, 6 Drawing Sheets

(56) References Cited

U.S. PATENT DOCUMENTS

| | | | |
|---|---|---|---|
| 8,978,141 | B2 | 3/2015 | Eliseev |
| 9,060,018 | B1 | 6/2015 | Yu et al. |
| 9,332,029 | B1 | 5/2016 | Tikhonov |
| 9,473,520 | B2 | 10/2016 | Dixon |
| 9,607,148 | B1 | 3/2017 | Magar |
| 11,546,767 | B1 | 1/2023 | Shaw |
| 12,273,376 | B2 | 4/2025 | Wang |
| 2007/0150957 | A1 | 6/2007 | Hartrell |
| 2008/0201129 | A1 | 8/2008 | Natvig |
| 2009/0320133 | A1* | 12/2009 | Viljoen ................. G06F 21/564 726/24 |
| 2011/0041179 | A1* | 2/2011 | Staahlberg ............ G06F 21/566 726/23 |
| 2013/0007883 | A1 | 1/2013 | Zaitsev |
| 2013/0340080 | A1 | 12/2013 | Gostev et al. |
| 2018/0288087 | A1 | 10/2018 | Hittel |
| 2019/0052659 | A1 | 2/2019 | Weingarten et al. |
| 2021/0014240 | A1 | 1/2021 | Wang |
| 2022/0038467 | A1 | 2/2022 | Kimura |
| 2023/0123046 | A1 | 4/2023 | Wang |

FOREIGN PATENT DOCUMENTS

| | | |
|---|---|---|
| EP | 4222923 | 6/2024 |
| GB | 2574093 | 11/2019 |
| WO | 2006132987 | 12/2006 |
| WO | 2019185404 | 10/2019 |
| WO | 2021001235 | 1/2021 |
| WO | 2021001237 | 1/2021 |
| WO | 2021165256 | 8/2021 |
| WO | 2021165257 | 8/2021 |
| WO | WO2021198295 A1 | 10/2021 |
| WO | 2022069401 | 4/2022 |

OTHER PUBLICATIONS

Muhammed Khan, et al. ("Cognitive Function of Polymorphic Malware Using Fractal Based Semantic Characterization", Apr. 25, 2017, 2017 IEEE International Symposium on Technologies for Homeland Security, pp. 1-7.) (Year: 2017).*

Wanping Liu, Shouming Zhong, "Web malware spread modelling and optimal control strategies", published on Feb. 10, 2017 (19 pages).

Wright Rob, "What is polymorphic virus?—Definition from WhatIs.com", 2021, pp. 1-5 URL: httQs:/Iweb.archive.org/webI20211127061825/httQs:/Iwww.techtarget.co (5 pages).

Jia Zhi-Juan et al., 2017 29th Chinese Control and Decision Conference (CCDC), 2017, "Research on computer virus source modeling with immune characteristics", pp. 4616-4619 p. 1, line 10, p. 2, col. 2, lines 16-17, p. 3, col. 2, lines 23-33, p. 4, col. 1, lines 6-10; figure 3; table 1, 2017 (4 pages).

Faghani Mohammad et al., 5th International Conference on New Technologies, Mobility and Security (NTMS), 2012, "A Study of Trojan Propagation in Online Social Networks", pp. 1-5 p. 3, col. 2, lines 11-16, 2012 (5 pages).

Beyah R A et al: "The case for collaborative distributed wireless intrusion detection systems", Granular Computing, 2006 IEEE International Conference on Atlanta, GA, USA May 10-12, 2006, Piscataway, NJ, USA, IEEE, May 10, 2006 (May 10, 2006), pp. 782-787, XP010918931 (6 pages).

Chenxi Wang et al: "On computer viral infection and the effect of immunization", Computer Security Applications, 2000, ACSAC '00. 16th Annual Conference E New Orleans, LA, USA Dec. 11-15, 2000, Los Alamitos, CA, USA, IEEE Comput. Soc, US, Dec. 11, 2000 (Dec. 11, 2000), pp. 246-256, XP010529822 (11 pages).

Combined Search & Exam Report for GB2203361.7 dated Oct. 17, 2022 (12 pages).

Combined Search & Exam Report for GB2203366.6 dated Oct. 21, 2022 (12 pages).

Combined Search and Exam Report for 2203371.6 dated Nov. 3, 2022 (12 pages).

Combined Search and Exam Report for 2004994.6 dated Jul. 13, 2020.

Combined Search and Exam Report for GB2002121.8 Dated Aug. 4, 2020.

Piet Van Mieghem, Computer Communications, vol. 35, Apr. 18, 2012, "The viral conductance of a network", pp. 1494-1506 see Abstract Section 2 (8 pages).

Eder-Neuhauser Peter et al: "Malware propagation in smart grid networks: metrics, simulation and comparison of three malware types", Journal of Computer Virology and Hacking Techniques, Springer Paris, Paris, vol. 15, No. 2, Aug. 28, 2018 (Aug. 28, 2018), pp. 109-125, XP036784835 (17 pages).

Exam Report for GB2002122.6 dated Nov. 30, 2021.

Faghani Mohammad R. et al: "A Study of Trojan Propagation in Online Social Networks" , 2012 5th International Conference on New Technologies, Mobility and Security (NTMS) , May 1, 2012 (May 1, 2012), pp. 1-5, XP055966357, ISSN: 2157-4952, DOI: 10.1109/NTMS.2012.6208767 ISBN: 978-1-4673-0227-2 p. 3, col. 2, lines 11-16.

Combined Search & Exam Report for GB2020915.1 dated May 11, 2021 5 pages).

Combined Search & Exam Report for GB2203355.9 dated Oct. 10, 2022.

Hernandez Guillen J D et al: "A mathematical model for malware spread on WSNs with population dynamics", Physica A, North-Holland, Amsterdam, NL, vol. 545, Nov. 22, 2019 (Nov. 22, 2019), XP086098687 (11 pages).

Hosseini Soodeh Ed—Vega-Rodriguez Miguel A et al: "Defense against malware propagation in complex heterogeneous networks", Cluster Computing, Baltzer Science Publishers, Bussum, NL, vol. 24, No. 2, Sep. 12, 2020 (Sep. 12, 2020), pp. 1199-1215, XP037444601 (17 pages).

Khan Muhamad Salman et al., IEEE International Symposium on Technologies for Homeland Security (HST), 2017, "Cognitive modeling of polymorphic malware using fractal based semantic characterization", pp. 1-7 p. 2, col. 1, lines 28-33, 2017 (7 pages).

International Preliminary Report on Patentability for PCT/EP2021/058360 issued Aug. 11, 2022 (14 pages).

International Preliminary Report on Patentability for PCT/EP2021/053763 dated Sep. 1, 2022 (9 pages).

International Preliminary Report on Patentability for PCT/EP2021/053764 dated Sep. 1, 2022 (9 pages).

International Report on Patentability for PCT/EP2021/083783 dated Jul. 13, 2023 (8 pages).

International Search Report & Written Opinion for PCT/EP2023/053489 dated Apr. 13, 2023 (16 pages).

International Search Report & Written Opinion for PCT/EP2023/053486 dated Apr. 13, 2023 (16 pages).

International Search Report & Written Opinion for PCT/EP2023/053493 dated Apr. 21, 2023 (16 pages).

International Search Report & Written Opinion for PCT/EP2023/053494 dated Apr. 21, 2023 (17 pages).

International Search Report & Written Opinion for FOR PCT/EP2021/053763 dated Mar. 9, 2021 (13 pages).

International Search Report & Written Opinion for PCT/EP2021/053764 dated Mar. 9, 2021 (13 pages).

International Search Report & Written Opinion for PCT/EP2021/083783 dated Mar. 1, 2022 (15 pages).

James Atwood et al: "Fair treatment allocations in social networks", arxiv.org, Cornell University Library, 201 Olin Libray Cornell University Ithaca, NY 14853, Nov. 1, 2019 (Nov. 1, 2019), XP081531701 (11 pages).

Lev Muchnik et al: "Initial growth rates of epidemics fail to predict their reach: A lesson from large scale malware spread analysis", arxiv.org, Cornell University Library, 201 Olin Library Cornell University Ithaca, NY 14853, Aug. 2, 2020 (Aug. 2, 2020), XP081730585 (19 pages).

Liu Guannan et al: "An Approach to finding the cost-effective immunization target for information assurance", Decision Support Systems, Elsevier, Amsterdam, NL, vol. 67, Aug. 19, 2014 (Aug. 19, 2014), pp. 40-52, XP029020334 (13 pages).

(56) References Cited

OTHER PUBLICATIONS

Matsubara Yasuko et al., "Nonlinear Dynamics of Information Diffusion in Social Networks", ACM Transactions on the Web (TWEB), ACM New York, 03 NY, USA, 2 Penn Plaza, Suite 701 New York NY 10121-0701 USA, 04 vol. 11, No. 2, Apr. 24, 2017 (Apr. 24, 2017), pp. 1-40, XP058693139 (40 pages).
Search Report for GB2002122.6 dated Nov. 30, 2021 (3 pages).
Examination Report for EP21824337.6 dated Jul. 1, 2024 (5 pages).
Extended European Search Report for EP 20157627.9 dated Jun. 12, 2020 (9 pages).
Extended European Search Report for EP 20157626.1 dated Jun. 12, 2020 (10 pages).
Extended European Search Report for 20168112.9 dated Sep. 4, 2020 (9 pages).
International Search Report and Written Opinion for PCT/EP2021/058360 dated Jun. 2, 2021 (12 pages).
US Non-Final Office Action for U.S. Appl. No. 17/904,453 dated Jun. 21, 2024 (12 pages).
Written Opinion for PCT/EP2021/058360 dated Apr. 22, 2022 (7 pages).
Xu Sheng et al: "Analysis of Malware-Induced Cyber Attacks in Cyber-Physical Power Systems", IEEE Transactions on Circuits and Systems II: Express Briefs, IEEE, USA, vol. 67, No. 12, Dec. 2020, pp. 3482-3486, XPO11822703 (5 pages).
International Preliminary Report on Patentability dated Sep. 19, 2024, issued for International Application No. PCT/EP2023/053486 (9 pages).

International Preliminary Report on Patentability dated Sep. 19, 2024, issued for International Application No. PCT/EP2023/053494 (10 pages).
International Preliminary Report on Patentability dated Sep. 19, 2024, issued for International Application No. PCT/EP2023/053489 (9 pages).
International Preliminary Report on Patentability dated Sep. 19, 2024, issued for International Application No. PCT/EP2023/053493 (9 pages).
Office Action dated Sep. 29, 2024, issued for U.S. Appl. No. 17/995,365 (33 pages).
Notice of Allowance dated May 14, 2025 issued for U.S. Appl. No. 17/904,467 (12 pages).
Office Action dated Dec. 2, 2024 issued for U.S. Appl. No. 17/904,467 (13 pages).
Notice of Allowance dated Dec. 31, 2024 issued for U.S. Appl. No. 17/904,453 (9 pages).
Office Action dated Apr. 3, 2025 issued for U.S. Appl. No. 17/904,453 (5 pages).
Notice of Allowance dated May 1, 2025 issued for U.S. Appl. No. 17/995,365 (10 pages).
Office Action dated Dec. 16, 2025, issued for U.S. Appl. No. 18/844,729 (9 pages).
Notice of Allowance dated Jan. 21, 2026, issued for U.S. Appl. No. 18/845,144 (10 pages).
Office Action dated Nov. 24, 2025 issued for U.S. Appl. No. 18/845,144 (9 pages).
Office Action dated Nov. 24, 2025 issued for U.S. Appl. No. 18/844,731 (12 pages).

* cited by examiner

Accessing a model of a set of computer systems — 600

Simulating a propagation of a malware through the set of computer systems — 602

Identifying one or more malware protection measures to be deployed to one or more of the computer systems — 604

Deploying the one or more malware protection measures to the one or more computer systems — 606

SIMULATION OF MALWARE WITH CHANGING SIGNATURES

CROSS-REFERENCE TO RELATED APPLICATIONS

This application is the U.S. national phase of International Application No. PCT/EP2023/053486 filed Feb. 13, 2023 which designated the U.S. and claims priority to GB 2203355.9 filed Mar. 10, 2022, the entire contents of each of which are hereby incorporated by reference.

TECHNICAL FIELD

Embodiments described herein relate generally to simulations of malware propagation through computer networks.

BACKGROUND

Conventional malware protection mechanisms are reactive to the detection of malware in a network or the widespread distribution of anti-malware measures. Such approaches are known as "diagnosis and treatment". Mitigation measures such as anti-malware or malware-specific protective measures may not be known for some time after an infection has been studied for its effects. Accordingly, it is beneficial to provide improvements in the simulation of the propagation of such infections through computer networks, thereby allowing for faster and more appropriate selection of malware protection mechanisms.

SUMMARY OF INVENTION

The present application relates to the field of a simulation of a network and, in particular, a network subject to a threat or attack such as malware or the like. The simulation is arranged to simulate the propagation of the threat through the network as each entity in the network (i.e. each device or machine) goes through a process of being susceptible to infection, then infected, then detected (i.e. infection is detected), then ultimately removed (e.g. the infection is either remediated, mitigated or the entity is disconnected/removed from the network).

The present application particularly relates to the simulation of malware which is capable of changing its identifiable features in order to evade detection. Such malware may be, for example, polymorphic malware or metamorphic malware. Polymorphic techniques involve frequently changing identifiable characteristics like file names, hashes, types, encryption keys or any other detectable characteristic to make the malware unrecognisable to many detection techniques.

The simulations of the present application apply a process of mutation to malware signatures during the simulation of propagation of the malware through a network. These simulations can be used to determine and deploy responsive measures in real-world systems with greater accuracy due to the simulation of the mutations.

In accordance with a first aspect of the invention, there is provided a computer-implemented method of simulating a propagation of a malware through a set of computer systems, the method comprising: identifying a simulated computer system infected with a simulated malware; determining a first signature of the simulated malware; determining that a mutation condition for the simulated malware has been met; and in response to determining that the mutation period has been met, changing the first signature of the simulated malware to a second signature.

Determining that the mutation condition has been met may include determining that a mutation period for the simulated malware has elapsed.

Determining that the mutation period for the simulated malware has elapsed may include: determining a first time point indicating when the simulated computer system was first infected with the simulated malware; and determining that the current time point is the same as or later than a sum of the first time point and the mutation period.

The mutation period may be fixed.

The mutation period may be variable.

The method may further include obtaining the mutation condition for the simulated malware using the first signature.

Obtaining the mutation condition for the simulated malware may include looking up the first signature in a list.

The method may further include adding the second signature to the list.

At least one of the first signature and the second signature may include one or more digits, a string, or a hash.

The method may further include randomly generating the second signature.

In accordance with a second aspect of the invention, there is provided a computer-implemented malware protection method to protect at least a subset of a set of computer systems from a malware, the method comprising: accessing a model of the set of computer systems; simulating a propagation of the malware through the set of computer systems using the model, wherein the simulating comprises any one of the methods set out above; and identifying one or more malware protection measures to be deployed to one or more of the set of computer systems based on the simulating.

The method may include deploying the one or more malware protection measures to the one or more computer systems.

In accordance with a third aspect of the invention, there is provided a system including one or more processors and a memory storing instructions that, when executed by the one or more processors, cause the one or more processors to perform any one of the methods set out above.

In accordance with a fourth aspect of the invention, there is provided a computer program comprising instructions that, when executed by a processor, cause the processor to perform any one of the methods set out above.

In the following, embodiments will be described with reference to the drawings in which.

DETAILED DESCRIPTION

The simulation of the present application models the propagation of a threat/infection/malware across the network based on modelled network communications and interactions between entities. Conventionally, such simulations employ a variety of parameters in such a model including: infection rates; detection rates; removal rates and the like. In conventional simulations, these rates are defined for the entire simulation, or at least a network or sub-network.

Figure 1:
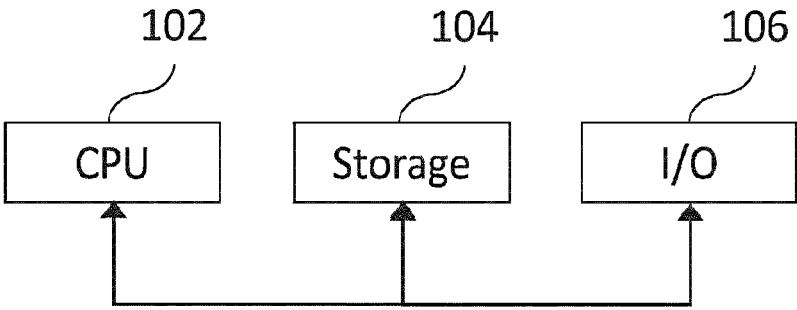
FIG. 1 shows a block diagram of a computer system suitable for the operation of the method according to some embodiments.

FIG. 1 is a block diagram of a computer system suitable for the operation of the present method according to some embodiments. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively, malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a target system, and propagation of the malware to other computer systems. The effects of malware on the operation and/or security of a computer system lead to a need to identify malware in a computer system in order to implement protective and/or remedial measures.

While malware detection is often directed to computer systems themselves or the networks over which they communicate, embodiments of the present invention recognise that interactions between computer systems transcend the physical interconnections therebetween.

In particular, embodiments of the present invention are directed to addressing interactions between electronic devices or computer systems that arise from communication between pairs of electronic devices or computer systems in a network. Such interactions can include, for example, interactions between users of each of a pair of electronic device or computer systems using, inter alia, social media, messaging, electronic mail or file sharing facilities. Thus, embodiments of the present invention employ a model or simulation of a set of electronic devices or computer systems in which interacting pairs of computer systems are identified, such interactions being based on previous communication occurring between the electronic device or computer systems in the pair.

Notably, such a model (or simulation) may disregard intermediates in an interaction—such as physical resources or other computer systems involved in a communication. For example, an interaction arising from a social media communication between two users using each of a pair of computer systems will involve potentially multiple physical or logical networks, intermediate servers, service provider hosts, intermediate communication appliances and the like.

As a result, a model (or simulation) of the physical communication becomes burdened by the intermediate features of a typical inter-computer communication. In contrast, embodiments of the present invention address the endpoints of an interaction such as the computer systems through which users communicate. A similar analysis can be conducted for interactions involving email, electronic messaging, file sharing and the like.

Ideally, the behaviour and characteristics of an infection in the simulation of the infected network accurately reflects the behaviour and characteristics of an infection in a real network. Embodiments of the present invention relate to improvements in such simulations, providing a more accurate simulation of the propagation of malware through a network (i.e. compared with the propagation of malware through a real network). This allows for a more effective determination of suitable mitigation measures that can be employed to mitigate the spread of the malware, or infection, throughout the network. The deployment of malware protection measures is targeted to provide an effective and/or efficient inhibition of the propagation of the infection on the network.

The nature and type of malware protection measures themselves are understood by those skilled in the art and can include, inter alia: anti-malware facilities; malware filters; malware detectors; a block, preclusion or cessation of interaction and/or communication, such as between computer systems; and/or a reconfiguration of one or more computer systems or communications facilities therebetween.

Embodiments of the present invention identify computer systems or interacting pairs of computer systems for the deployment of malware protection measures based on a simulation of a propagation of malware through the model of a set of computer systems. Such a simulation employs simulation parameters including: a rate of interaction (or a contact rate) between each interacting pair of computer systems (i.e. a number of interactions per time period); a rate of transmission of the malware between interacting computer systems per interaction; a rate of detection of malware in the network; and a rate of removal of computer systems from the network to slow or stop the rate of infection. Some or all of these parameters may be derived statistically according to a statistical distribution. In some embodiments, some or all of these parameters may be determined based on historical interaction information over a historical time period. In some embodiments, some or all of these parameters are determined based on one or more machine learning processes based on historical interaction information.

Preferably, mitigation measures are intended to directly affect the transmission rate, detection rate, and/or removal rate for a malware, or an infection, propagating through a network. For example, implementing an adjustment or supplement to security facilities such as antimalware, proxies, firewalls and the like within the network such as by modifying policies for such facilities can directly affect one or more of these rates.

Mitigative measures can further include protective or interruptive measures including one or more of, inter alia: deployment of malware remediation facilities such as antimalware; the isolation of a subset of the network by interrupting communications along one or more selected edges; the disconnection of one or more devices from the network; the instigation of protective measures in respect of data stored at devices in advance of their predicted infection such as backup, storage, offlining or disconnection of sensitive data stores; the generation of new networks of devices such as to exclude devices predicted to be infected; affecting a transmission rate within a network or between pairs of devices in the network such as by throttling or otherwise affecting a rate or frequency of communication between devices, or to limit/constrain a "size" of communication (e.g. payload size) or otherwise constrain communication (e.g. imposing new limits) [all of these are particularly beneficial]; and the propagation of alerts and/or information to devices on the network. Such mitigative measure can be determined and configured cognisant of the time required to effect such mitigation and the forecast state of the network and malware infection over such a time period.

Figure 2:
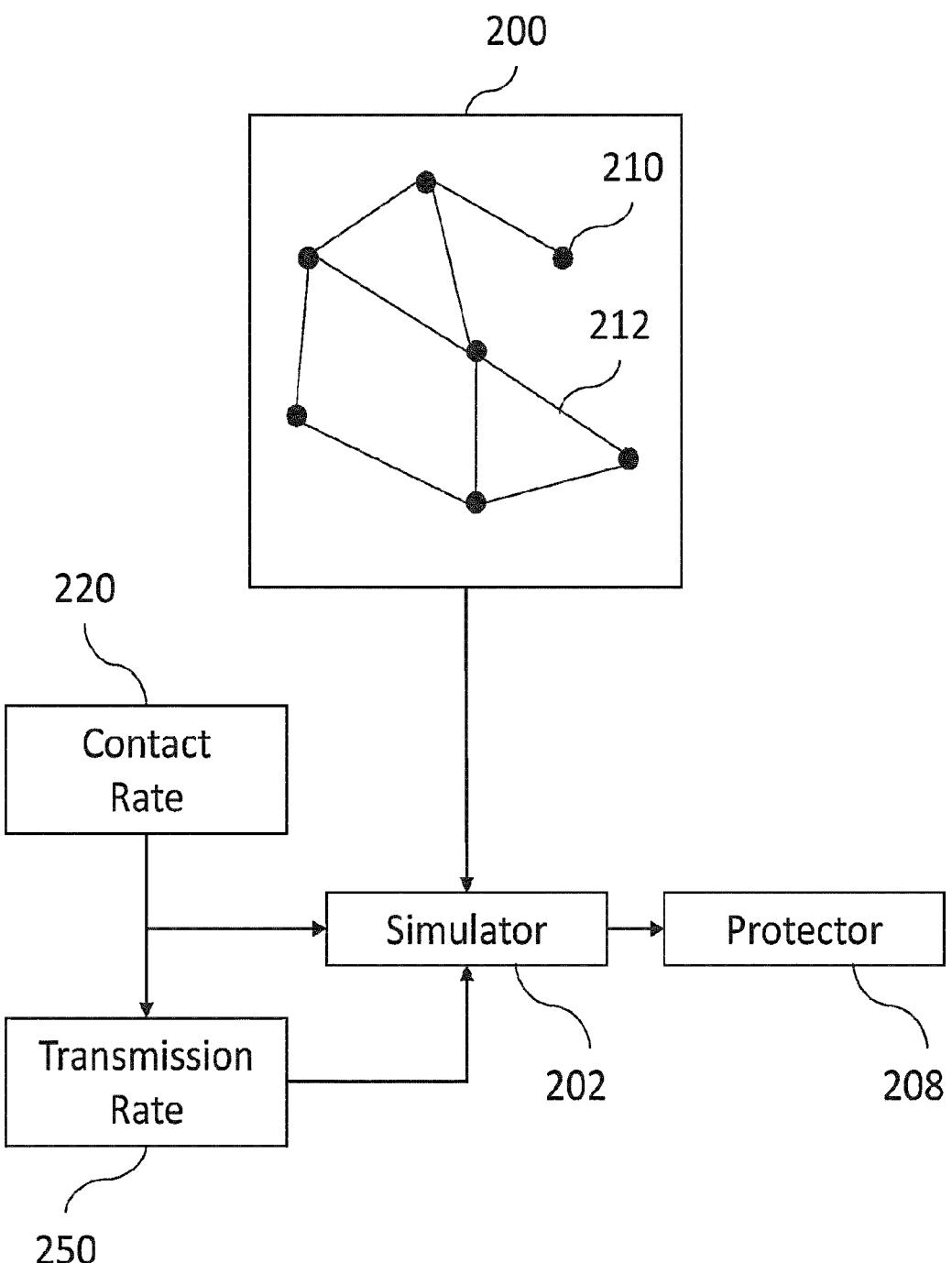
FIG. 2 shows a component diagram of an arrangement for malware protection for at least a subset of a set of computer systems according to some embodiments.

FIG. 2 is a component diagram of an arrangement for malware protection for at least a subset of a set of computer systems according to an embodiment of the present invention. A model 200 is provided as one or more data structures representing a set of computer systems and interactions therebetween. Preferably, the model is provided as a graph or similar data structure including nodes or vertices 210, each corresponding to a computer system, and edges 212 each connecting a pair of nodes 210 and representing interaction between electronic devices or computer systems corresponding to each node in the pair. Thus, an edge 212 represents interaction between a pair of electronic devices or computer systems. Each node 210 can have associated information for a corresponding node (i.e. electronic device or computer system) including, for example, inter alia: an identifier of the computer system; an identification of an organisational affiliation of the computer system; an identifier of a subnet to which the computer system is connected; and other information as will be apparent to those skilled in the art.

Preferably, an edge 212 constitutes an indication that at least one interaction has taken place over at least a predetermined historic time period between computer systems in a pair. Preferably, the existence of an edge 212 is not determinative, indicative or reflective in of itself of a degree, frequency, or propensity of interaction between computer systems in a pair. Rather, the edge 212 identifies that interaction between nodes can or has taken place. In some embodiments, edges 212 can have associated, for example, inter alia: an edge identifier; an identification of a pair of nodes (and/or the corresponding electronic devices or computer systems) that the edge interconnects; and/or interaction frequency information between a pair of computer systems.

It will be appreciated by those skilled in the art that, while the model 200 is illustrated as a literal graph in the arrangement of FIG. 2, alternative data structures and logical representations of vertices and edges can be used, such as representations employing, for example, inter alia, vectors, arrays of vectors, matrices, compressed data structures and the like.

The arrangement of FIG. 2 includes a simulator 202 as a hardware, software, firmware or combination component arranged to perform a simulation of a propagation of a malware in the set of computer systems represented by the model 200.

The simulator 202 is operable on the basis of simulation parameters including: an contact rate as a number of interactions between pairs of interacting computer systems in a time period; and a transmission rate 250 as a rate of transmission of a malware between computer systems in a pair of systems per interaction. The transmission rate 250 is a probability of transmission of a malware from one node to another node during an interaction between the nodes. The transmission rate 250 may incorporate aspects of a malware infection process.

For example, in the case of malware transmitted as a web-link between two computer systems by email, the transmission rate can reflect all of: a probability that an email is communicated between the two computer systems; a probability that the email includes the malicious web-link; and a probability that a recipient accesses the malicious web-link resulting in malware infection.

The simulator 202 can operate on the basis of configurable characteristics such as simulation assumptions. For example, the simulator 202 may operate on the basis that any computer system as represented by a node in the model 200 can only transmit the malware to first-degree neighbours according to the model 200.

Further, the simulator 202 preferably operates on the basis that each computer system has a state of infection at a point in time. States of infection at a point in time can include, for example: a state of susceptibility in which a computer system is susceptible to infection, such as a computer system that is not and has not been so far infected and is not specifically protected from infection by a particular malware; a state of infected in which a computer system is subject to infection by the malware at the point in time; and a state of removed or remediated in which a computer system is remediated of a past infection or protected from prospective infection by the malware.

It will be appreciated by those skilled in the art that sub-states of these states can also be employed, such as, inter alia: an infected state that is not infectious (i.e. transmission of malware cannot be effected by a computer system in such a state); an infected state that is infectious; an infected state that is detected; and an infected state that is not detected (such as might be determined by the simulator 202).

Therefore, in use, the simulator 202 is operable for a time period to model the propagation of a malware infection. In some embodiments, one or more predetermined source computer systems represented in the model 200 are selected as originating computer systems for the malware infection such that propagation is simulated from such originating computer systems. Preferably, the simulator 202 is executed for each of a plurality of time periods so as to model the propagation of the malware in the set of computer systems over time. Additionally or alternatively, the simulator 202 can be performed a plurality of times for each of a plurality of predetermined source computer systems selected as originating computer systems for the malware infection.

Figure 3:
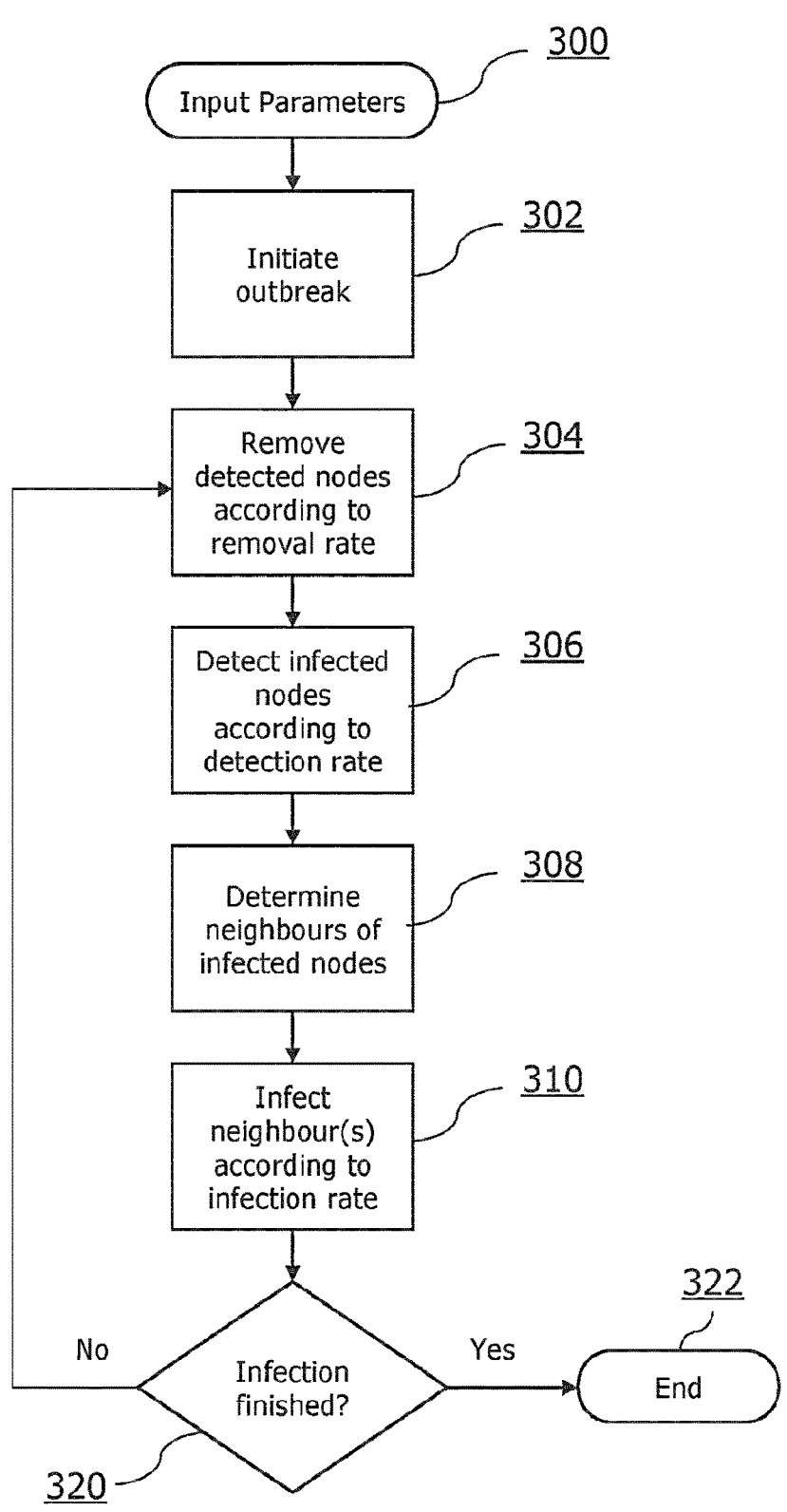
FIG. 3 shows a flowchart illustrating a simulation of propagation of a malware according to some embodiments.

FIG. 3 is a flowchart illustrating a simulation of propagation of a malware according to some embodiments. In this example, the simulation is built on a network graph model (e.g. as illustrated in FIG. 2).

At step 300, several parameters are defined for the simulation and input into the simulator, including a removal rate, a detection rate and an infection rate. Each of these parameters takes a value between 0 and 1. In some embodiments, one or malware protection measures may be deployed. The malware protection measures may be any one of the malware protection measures described herein.

In the present example, each of the nodes has four Boolean states: susceptible, infected, detected, and removed. Initially, every node is set to susceptible, uninfected, undetected and not removed. At step 302, an outbreak is initiated by setting the state of one or more nodes to infected. These nodes may be referred to as "outbreak nodes".

At step 304, detected nodes are removed from the network according to the removal rate. That is to say, the infected nodes that have been detected are isolated from the rest of the network (i.e. by severing the connection to neighbouring nodes). The state of these nodes is set to "removed".

At step 306, a number of the infected nodes are detected according to the detection rate. The state of these nodes is set to "detected".

At step 308, the neighbours of the infected nodes are determined. The susceptible neighbours are then infected according to the infection rate at step 310. The state of these nodes is set to "infected".

At step 320, it is determined whether the infection is finished, i.e. whether the malware is able to spread any further, or if the maximum number of steps for the simulation has been reached. For example, if the infected nodes are all removed, then these nodes cannot infect any other nodes and the malware cannot spread any further. If the malware cannot spread any further, the simulation ends at step 322, and optionally statistics for the simulation are calculated. Otherwise, if the malware can still spread further, steps 304-310 are repeated.

Steps 304 to 308 are discussed above in a particular sequence. However, it will be appreciated that this sequence is not intended to be limiting, and steps 304 to 308 may instead be carried out in any appropriate sequence or order.

As is further shown in FIG. 2, responsive to the simulation by the simulator 202, and, in particular, responsive to the model of propagation of a malware determined by the simulator 202, a protector component 208 may be implemented. Here, the protector 208 may be operable to deploy malware protection measures intended to inhibit a propagation of the malware through the set of computer systems. The protector component 208 may be a hardware, software, firmware or combination component arranged to access output from the simulator 202 such as one or more models, data structure representations, images, animations, visually renderable indications or other suitable representations of states of nodes corresponding to simulated states of computer systems in the set of computer systems. For example, a representation of states of computer systems may be provided based on the model 200 so as to indicate, for each computer system by way of a node in the model 200, a state of the computer system (such as susceptible, infected, removed) over each of a plurality of time periods for which the simulator 202 was executed.

The protector 208 may identify one or more computer systems or interacting pairs of computer systems (such as are represented by edges 212 in the model 200) for the deployment of malware protection measures. Such identified systems or pairs of systems can be selected based on, for example, inter alia: a computer system or interacting pair of systems through which malware propagates in the simulation to a subset of other computer systems in the set of computer systems; identifying a subset of computer systems having a relatively greater, or greatest, proportion of computer systems infected by the malware according to the simulation, so as to identify one or more computer systems or pairs of systems as a gateway, link or bridge to such identified subset; a number of computer systems to which the malware is propagated via a computer system or pair of systems; and other criteria as will be apparent to those skilled in the art. For example, "choke-points" in the model 200 can be identified by the protector 208 based on the simulator 202 output as nodes or pairs of nodes representing computer systems or interacting pairs of systems constituting pathways for propagation of the malware to subsets of nodes in the model 200. The malware protection measures deployed by the protector 208 can include those previously described, and in this way at least a subset of the set of computer systems can be protected from the malware by the targeted deployment of malware protection measures.

In view of the above, the simulator 202 can be used to simulate the propagation of malware through a computer network (or computer system) in a realistic manner, such that the protector 208 may use the simulation to improve the selection of one or more appropriate malware protection measures for implementing in the computer network. Such appropriately selected one or more malware protection measures may then be deployed in a computer network (or computer system), either in response to a real malware infection, or as a pre-emptive measure to prevent or reduce the likelihood of an infection propagating. Consequently, the more realistic the simulation of malware propagation in the modelled computer network is, the better the protector 208 is able to select an appropriate and effective malware protection measure to contain, counteract, or pre-emptively prevent a real malware infection in the computer network.

Figure 4:
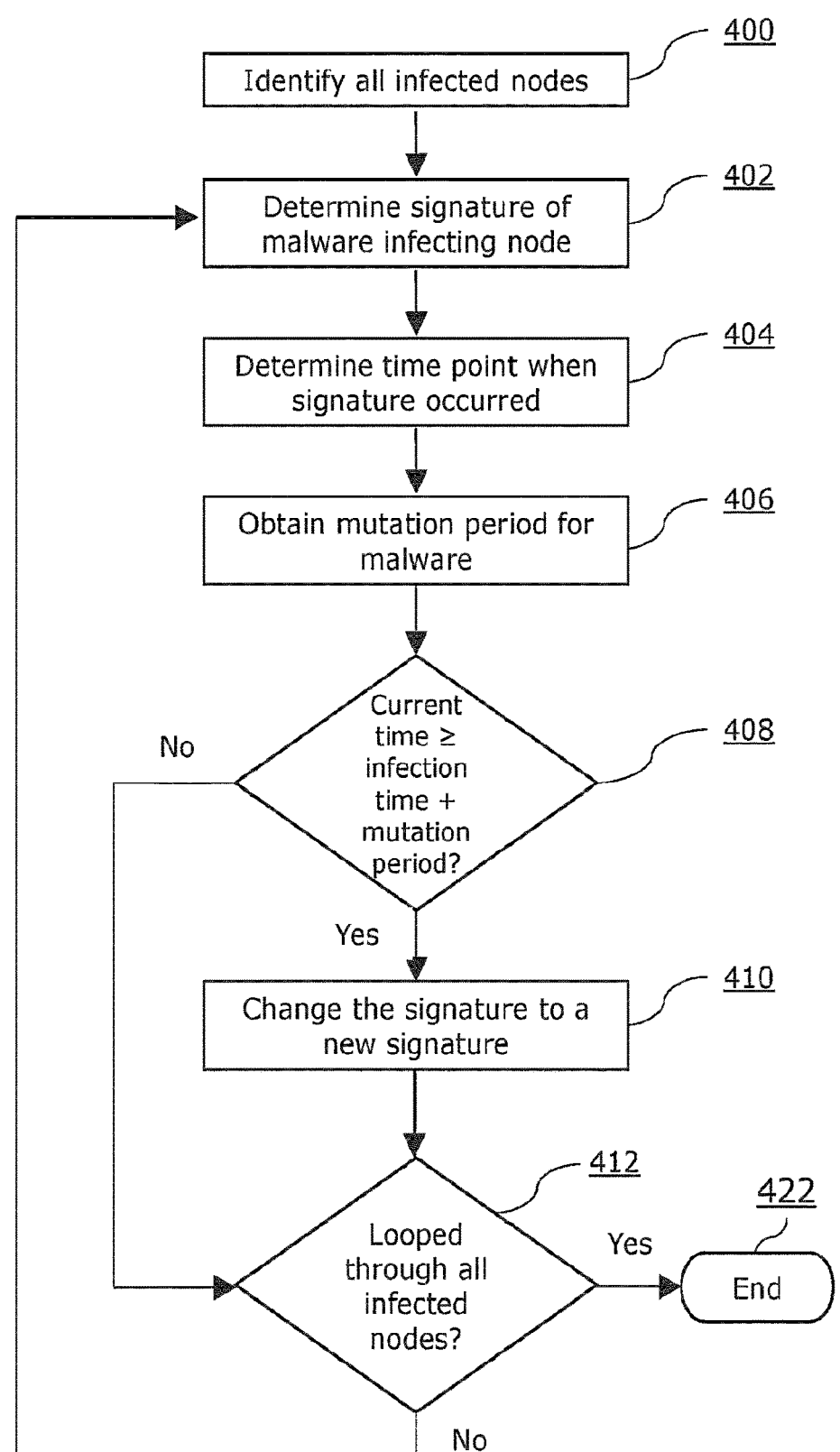
FIG. 4 shows a flowchart illustrating a method of simulating mutations of a malware according to some embodiments.

FIG. 4 shows a flowchart illustrating a method of simulating mutations of a malware according to some embodiments. In this method, the malware has a signature which is updated to a new signature when a mutation condition is met. This allows propagation of a malware such as a polymorphic malware through a set of computer systems to be simulated.

In the present embodiment, the mutation condition is met when a mutation period for the malware has elapsed. The mutation period is a period of time (e.g. 2 hours) measured from the time at which a computer system is infected. In other embodiments, mutation of a malware may be triggered depending on the success rates of other variants, e.g. a given variant of the malware may mutate more frequently if other variants have poor success rates. This could be achieved using a command and control server, which observes the poor performance of a polymorphic malware and could trigger mutations. In still other embodiments, the mutation may be triggered on the basis of certain services being available (e.g. a service it uses to mutate).

In the present embodiment, the mutation period is a fixed period of time (i.e. the mutation period remains constant over time). In other embodiments, the mutation period may vary over time. In such embodiments, values for the mutation period may be generated according to a probabilistic distribution (e.g. the normal distribution). Alternatively, the mutation period may be determined based on the processing power of the infected computer system. For example, an Internet of things (IoT) device has a relatively low computational capability, so a malware infecting such a device could take longer to mutate, whereas a server has a relatively high computational capability, so the malware may mutate faster.

At step 400, all the nodes infected with a malware are identified.

At step 402, for each of the infected nodes, a signature of the malware is determined. The signature may be, for example, a digit, or a sequence of digits.

At step 404, an infection time (i.e. the time at which the signature first occurred) is determined. Next, at step 406 a mutation period for the malware is obtained. In the present embodiment, the mutation period for the malware is obtained using the signature of the malware, by looking up the signature in an all malwares list. This is a list which contains metadata for malwares. The mutation period for a given malware can be stored within the metadata for the malware.

At step 408, the current time is compared with a time which is the sum of the infection time and the mutation period. If the current time is before this calculated time, then the mutation period has not elapsed, and the method progresses to the next infected node at step 412. If the current time is later than the calculated time, then the mutation period has elapsed.

At step 410, in response to determining that the mutation period has elapsed, the signature is changed to a new signature. For example, the initial signature may be "0", and may be changed to a new signature which is "1". The new signature may be randomly generated, or may be generated using the initial signature as an input. In some embodiments, the new signature may be added to the all malwares list.

At step 412, the method progresses to the next infected node. Once the method has looped through all the infected nodes, the simulation of the mutations ends at step 422.

Figure 5:
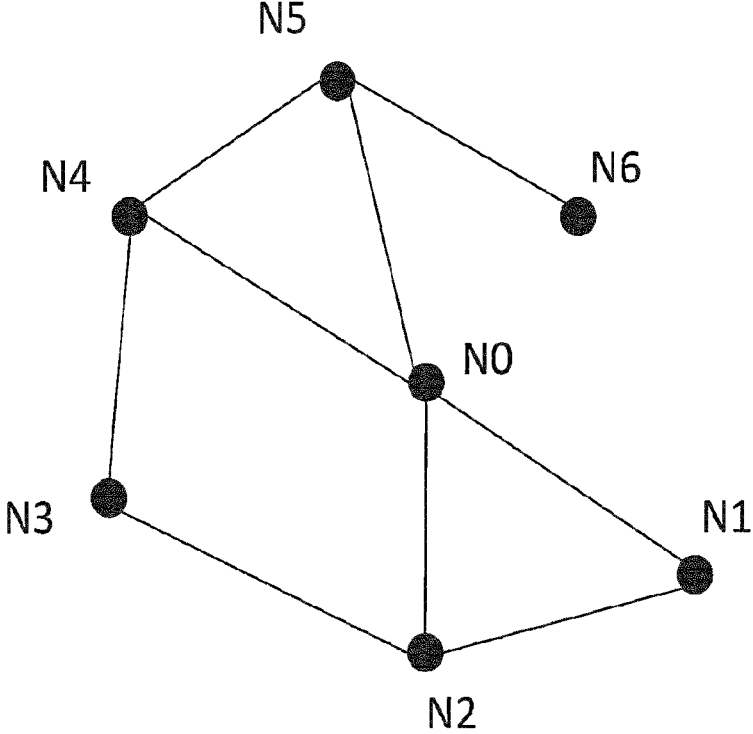
FIG. 5 shows an example of a network graph.

An example of a network graph is shown in FIG. 5. The network graph includes seven nodes N1-N7, each corresponding to a computer system. Each of the nodes is connected to at least one other node.

An example simulation using the network graph shown in FIG. 5 will now be described. In this example, the step time is 1 hour and the total time for the simulation is 24 hours. The mutation period for the malware is 2 hours. The infection rate is 0.2, the detection rate is 0.8, and the removal rate is 1.0.

At step S1, the time for the simulation is initialised to t=00:00. The all malwares list is empty (since no malwares are present), and the detected malwares signature list is also empty (since no malwares have been detected at this point).

At step S2, the state of the central node N0 is set to infected with a malware, and the infected time point is set to t=00:00. The signature of the malware is set to A1, and the signature A1 is added to the all malwares list.

At step S3, the time is incremented by 1, so t=01:00.

At step S4, detected nodes are removed according to the removal rate. At present, no nodes have been detected, so no nodes are removed.

At step S5, nodes with known signatures are detected. At present, no nodes have been detected, therefore there are no nodes with known signatures to detect.

At step S6, nodes with unknown signatures are detected according to the detection rate.

At step S7, neighbours of infected nodes are infected according to the infection rate. In the present example, the node N2 is infected, i.e. the malware having signature A1 is passed on to node N2 from node N0.

At step S8, the signature of a given infected node is mutated if the mutation period for the infected node has passed. In order to do this, all of the infected nodes are determined, along with the times at which they were infected. For each infected node, the current time in the simulation is subtracted from sum of the infected time for the node and the mutation period. If the result of this calculation is a less than or equal to zero, then the mutation period has elapsed and the signature for the node is altered. If the result is a positive number, then the signature is not altered. In the present example, node N0 was infected at t=00:00, and the sum of this time and the mutation period is 02:00. Subtracting the current time (01:00) gives a value of 1, which is positive. Hence, not enough time has passed for node N0 to mutate, and the signature for node N0 will not be altered. Node N2 has just been infected, and so node N2 will also not mutate.

At step S9, the time is incremented by 1 hour, so t=02:00.

At step S10, detected nodes are removed according to the removal rate. At present, no nodes are detected, so no nodes are removed.

At step S11, nodes with known signatures are detected. At present, no nodes have been detected, therefore there are no nodes with known signatures to detect.

At step S12, nodes with unknown signatures are detected according to the detection rate. In this case, the central node N0 is detected as infected. As a result, its status is set to detected and the signature A1 is added to the detected signatures list.

At step S13, neighbours of infected nodes are infected according to the infection rate. In the present example, node N0 randomly infects one other node N4, i.e. the malware having signature A1 is passed on from node N0 to node N4.

At step S14, the signatures of the infected nodes are mutated if the mutation time has elapsed. In the present example, node N0 was infected at t=00:00 and subtracting the sum of this time and the mutation period from the current time (02:00) gives zero. The mutation period has elapsed. The signature A1 for node N0 is changed to a new signature A2, and the infected time point for node N0 is updated to t=02:00. The other infected nodes N2 and N4 have not been infected long enough to mutate, and so the signatures for these notes are not altered.

At step S15, the time is incremented by 1 hour, so t=03:00.

At step S16, the detected nodes are removed according to the removal rate. In the present example, node N0 is removed.

At step S17, nodes with known signatures are detected. In the present example, signature A1 has been stored in the detected signatures list, so infected nodes N2 and N4 are detected.

At step S18, nodes with unknown signatures are detected according to the detection rate. In the present example, no new nodes are detected.

At step S19, neighbours of infected nodes are infected according to the infection rate. In the present example, nodes N3 and N5 are infected with malware having the A1 signature.

At step S20, the signatures of the infected nodes are mutated if the mutation time has elapsed. In the present example, enough time has passed for the node N2 to mutate, as the current time is 03:00 and it was infected at 01:00. The signature A1 is changed to a new signature B1, and the infected time point for node N2 is updated to t=03:00.

The steps of time incrementation, removal, detection, infection and mutation are repeated until the infection has finished and no more nodes can be infected.

Figure 6:
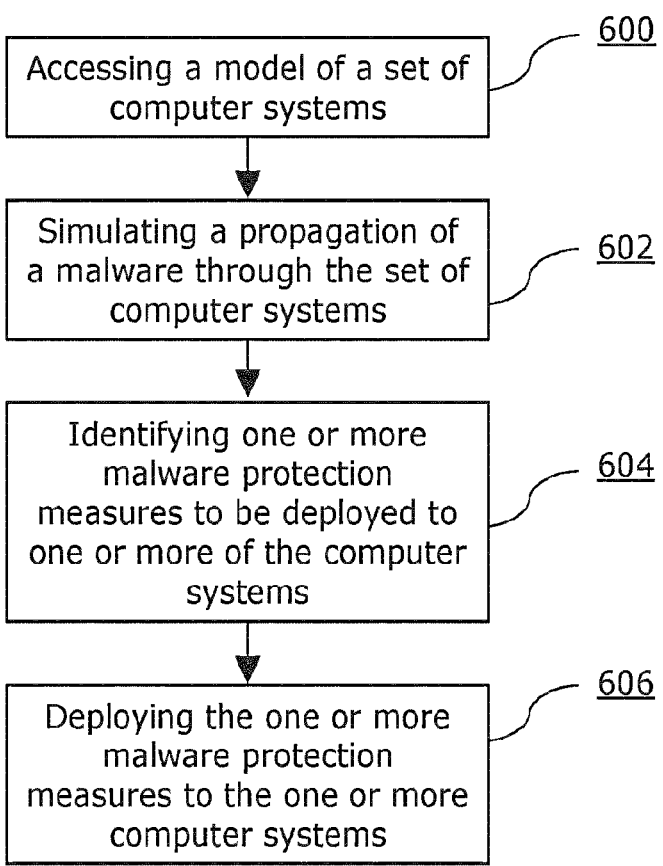
FIG. 6 shows a flowchart illustrating a method of a malware protection method according to some embodiments.

FIG. 6 is a flowchart of a malware protection method according to some embodiments. The malware protection method aims to protect at least a subset of a set of computer systems from a malware.

At step 600, a model of a set of computer systems is accessed. The model may be a graph, e.g. as shown in FIG. 2. The model identifies computer systems in the set of computer systems.

At step 602, propagation of the malware through the set of computer systems is simulated using the model. The simulation may be performed using any of the methods described herein, for example the method described above in relation to FIG. 4.

At step 604, one or more malware protection measures that are to be deployed to one or more computer systems are identified. The malware protection measures are identified based on the results of the simulation performed in step 602.

At step 606, the malware protection measures identified in step 604 are deployed to the one or more computer systems.

There are many advantages associated with simulating a malware with changing signatures compared to prior art simulations which do not take changing signatures into account. One such advantage is the ability to quickly recognise a malware because its signature has been detected before. This means that computer systems infected with malware having a known signature can be detected easily, potentially leading to a greater number of infected computer systems being detected at a given point in the propagation of the malware. Being aware of a greater number of infected computer systems may mean that more potential options for malware protection measures are available. For example, detecting an infected computer system having a relatively low number of neighbouring computer systems may lead to the decision to remove this particular computer system from the network, which would affect relatively few neighbouring computer systems.

As another example, consider a situation where a malware is mutating rapidly. In prior art approaches, removing and cleaning computer systems may be identified as an appropriate response. This is reasonable for this type of situation, given that the challenges in detecting the malware with changing signatures (or the concept of such malware in general) are not considered. However, when the changing signatures are taken into account, patching computer systems may be identified as an appropriate malware protection measure, since once a computer system is patched it cannot be rapidly reinfected by a different mutation.

Any of the above discussed methods may be performed using a computer system or similar computational resource, or system comprising one or more processors and a non-transitory memory storing one or more programs configured to execute the method. Likewise, a non-transitory computer readable storage medium may store one or more programs that comprise instructions that, when executed, carry out the methods described herein.

Whilst certain embodiments have been described, these embodiments have been presented by way of example only, and are not intended to limit the scope of the application. Indeed, the novel devices, and methods described herein may be embodied in a variety of other forms; furthermore, various omissions, substitutions and changes in the form of the devices, methods and products described herein may be made without departing from the scope of the present application. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage. The accompanying claims and their equivalents are intended to cover such forms or modifications as would fall within the scope of the application.

The invention claimed is:

1. A computer-implemented method of simulating a propagation of a malware through a set of computer systems, the method comprising:
 identifying a simulated computer system infected with a simulated malware;
 determining a first signature of the simulated malware;
 determining that a mutation condition for the simulated malware has been met; and
 in response to determining that the mutation condition has been met, changing the first signature of the simulated malware to a second signature; wherein:
 the determining that the mutation condition has been met comprises determining that a mutation period for the simulated malware has elapsed; and the mutation period is a period of time that begins at a first time point indicating when the simulated computer system was first infected with the simulated malware.

2. The method of claim 1, wherein determining that the mutation period for the simulated malware has elapsed comprises:
 determining the first time point indicating when the simulated computer system was first infected with the simulated malware; and
 determining that the current time point is the same as or later than a sum of the first time point and the mutation period.

3. The method of claim 1, wherein the mutation period is fixed.

4. The method of claim 1, wherein the mutation period is variable.

5. The method of claim 1, further comprising obtaining the mutation condition for the simulated malware using the first signature.

6. The method of claim 5, wherein obtaining the mutation condition for the simulated malware comprises looking up the first signature in a list.

7. The method of claim 6, further comprising adding the second signature to the list.

8. The method of claim 1, wherein at least one of the first signature and the second signature comprises one or more digits, a string, or a hash.

9. The method of claim 1, further comprising randomly generating the second signature.

10. A computer-implemented malware protection method to protect at least a subset of a set of computer systems from a malware, the method comprising:
 accessing a model of the set of computer systems;
 simulating a propagation of the malware through the set of computer systems using the model, wherein the simulating comprises
 identifying a simulated computer system infected with a simulated malware;
 determining a first signature of the simulated malware;

determining that a mutation condition for the simulated malware has been met; and in response to determining that the mutation condition has been met, changing the first signature of the simulated malware to a second signature; wherein:

the determining that the mutation condition has been met comprises determining that a mutation period for the simulated malware has elapsed; and the mutation period is a period of time that begins at a first time point indicating when the simulated computer system was first infected with the simulated malware; and identifying one or more malware protection measures to be deployed to one or more of the set of computer systems based on the simulating.

11. The method of claim 10, comprising:

deploying the one or more malware protection measures to the one or more computer systems.

12. A system simulating a propagation of a malware through a set of computer systems, the system comprising:

one or more processors and a memory storing instructions that, when executed by the one or more processors so that the system for simulating the propagation of malware in a network is at least configured to:

identify a simulated computer system infected with a simulated malware;

determine a first signature of the simulated malware;

determine that a mutation condition for the simulated malware has been met; and in response to the determination that the mutation condition has been met, change the first signature of the simulated malware to a second signature; wherein:

the determination that the mutation condition has been met comprises a determination that a mutation period for the simulated malware has elapsed; and the mutation period is a period of time that begins at a first time point indicating when the simulated computer system was first infected with the simulated malware.

13. The system of claim 12, wherein, to determine that the mutation period for the simulated malware has elapsed, the system is at least further configured to:

determine the first time point indicating when the simulated computer system was first infected with the simulated malware; and determine that the current time point is the same as or later than a sum of the first time point and the mutation period.

14. The system of claim 12, wherein the mutation period is fixed.

15. The system of claim 12, wherein the mutation period is variable.

16. The system of claim 12, wherein the system is further configured to randomly generate the second signature.

17. A non-transitory computer-readable storage medium storing a computer program comprising instructions that, when executed by a processor, cause the processor to perform the method of claim 1.

* * * * *